US006995707B2

(12) United States Patent
Karabin et al.

(10) Patent No.: US 6,995,707 B2
(45) Date of Patent: Feb. 7, 2006

(54) INTEGRATED MARITIME PORTABLE ACOUSTIC SCORING AND SIMULATOR CONTROL AND IMPROVEMENTS

(75) Inventors: Christopher R. Karabin, White Plains, MD (US); Bruce P. Chandler, Indian Head, MD (US); Joseph E. Padgett, Jr., Mechanicsville, MD (US); James Theisen, La Plata, MD (US); Stephen A. Smith, Waldorf, MD (US); Joseph M. Pastorious, Waldorf, MD (US); John A. Nial, Jr., Park Hall, MD (US); Christopher L. Rice, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/807,574

(22) Filed: Mar. 18, 2004

(65) Prior Publication Data

US 2005/0206560 A1 Sep. 22, 2005

(51) Int. Cl.
*G01S 5/14* (2006.01)
*G09B 19/00* (2006.01)
*H04B 1/59* (2006.01)

(52) U.S. Cl. .......................... 342/357.09; 342/357.02; 434/17; 434/25; 367/5

(58) Field of Classification Search .......... 342/357.09, 342/357.1; 367/3, 5; 434/9, 17, 25

See application file for complete search history.

(56) References Cited

U.S. PATENT DOCUMENTS

| 4,057,913 A | 11/1977 | Eisenberg ...................... 35/12 |
| 4,622,557 A * | 11/1986 | Westerfield ............ 342/357.09 |
| 4,639,900 A * | 1/1987 | Gustafson ...................... 367/5 |
| 4,654,008 A | 3/1987 | Elmore ........................ 434/16 |
| 2002/0118599 A1 | 8/2002 | Deveau ....................... 367/13 |
| 2003/0152892 A1 | 8/2003 | Huang et al. ................. 434/11 |

OTHER PUBLICATIONS

Stotts, Stephen et al, "Multiple-Source Localisation Using GPS Technology and Received Arrival Time Structure Analysis in an Air-Deployed System," IEEE Journal of Oceanic Engineering, vol. 22, No. 3, Jul. 1997, pp 576-582.*

(Continued)

Primary Examiner—Gregory C. Issing
(74) Attorney, Agent, or Firm—Fredric J. Zimmerman

(57) ABSTRACT

The invention, as embodied herein, comprises an improved portable maritime scoring and simulation system that comprises three or more buoys that are deployed in an area of water selected for maritime combat training. Attached to each buoy are a global positioning system receiver, an RF radio system, an acoustic analysis system, and a microprocessor. The acoustic analysis system is designed to capture an acoustic signature of ordnance impacting the water with predetermined characteristics. The system includes an RF radio repeater system linked to a system controller to control and monitor the elements of the system. In operation, when an acoustic signature is captured by the acoustic analysis system, the RF radio system, in one embodiment, transmits the time of the capture along with the GPS location of the buoy to the RF radio repeater system linked to the system controller. When three or more buoys transmit a captured acoustic signature, the system controller computes the location of impact using a location process. The invention also includes an improved method of controlling the system.

17 Claims, 4 Drawing Sheets

OTHER PUBLICATIONS

Landis, Tara, "Indian Head's IMPASSE System Proves to be Right on Target," NAVSEA News Wire, Dec. 13, 2002, 2 pages.*

Dunaway, Capt. Michael, USN (ret), "Office of Naval Research Virtual At Sea Training (VAST)," presented at the National Defense Industrial Association 7th Annual Artillery Symposium, Jun. 19, 2002, pp. 1-14.*

Erwin, Sandra I. "Congress Ups Funding For Live-Fire Testing," National Defense Magazine, Nov. 2001, 2 pages.*

Navy Newstand, "Navy and Air Force Hit Virtual Bull's Eye at Sea," Story No.: NNS021117-01, published Nov. 17, 2002, pp. 2.*

Zacharias, Maria, "Virtual Training Offers Sailors Surface Support Training Nearly Anywhere," The Flagship, http:wwwflagshipnews.com/archives_2003/mar202003_15.shtml, 2 pages.*

Paquette, Dale R. et al., "Virtual Training for Live Fire Naval Gunfire Support," IEEE Conference and Exhibition OCEANS 2000, Sep. 2000, pages 733-737.*

METOCEAN Mobile Acoustic Scoring System (MASS) Product Data Sheet, 2 pages.*

METOCEAN MASS General Information Sheet, http://www.metocean.com/corp.asp?v=812200450602&item_id=88, 2 pages. □□.*

* cited by examiner

INTEGRATED MARITIME PORTABLE ACOUSTIC SCORING AND SIMULATOR CONTROL AND IMPROVEMENTS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention pertains to portable military training devices and methods, more particularly to training devices and methods for scoring and simulating maritime combat operations, and most particularly to training devices and methods for scoring and simulating maritime combat operations using the acoustic signature created by projectiles, bombs, missiles, etc. as they strike the water. The present invention also pertains to a method the U.S. Navy uses to formally qualify and certify the surface gun teams.

2. Description of the Related Art

For many years, naval warfare training consisted of live naval fire at weapons training facilities or fixed instrumented ranges. These weapons training facilities or instrumented ranges are tied to specific locations, facilities, or bases.

However, due to both environmental and social issues related to long-term firing of munitions, explosives, etc. at fixed facilities, the future use of weapons training facilities or instrumented ranges in many locations may be jeopardized.

To address this concern, a general concept for a portable maritime acoustic scoring and simulation system for naval combat training was developed. This general concept called for four buoys, each comprising an acoustic detection system, a global positioning system (GPS) receiver, a RF radio system, and a microprocessor to be deployed in the water at particular locations. When a projectile, explosive, missile, etc. enters the water, an acoustic signal is generated. The time-of-arrival of the acoustic signal at each buoy and the GPS position of the buoy was transmitted via the RF radio system to an RF radio repeater system, RF linked to a general controller, located on a supporting platform. The general controller computed the impact location based on the time-of-arrival and GPS position data from each reporting buoy. A digital audio tape (DAT) recorder was attached to each acoustic detection system to continuously record acoustic data for post exercise analysis. Also, to detect each gun fire event, and to track the GPS position of the firing platform, a buoy was deployed on the deck of the firing platform.

While this general concept solved many of the potential problems referenced above, the original system concept had several shortcomings. First, the system had a very limited use for non-explosive (low energy) impacts because it employed a simple threshold detection circuit that merely indicated if a certain sound level was exceeded. This type of circuit would normally only detect explosive type impacts. Therefore, any training using the system required the use of "live" explosive ordnance, which would be extremely expensive and potentially dangerous. Second, the acoustic data logging capability was limited to roughly two hours which did not provide sufficient capability for current naval exercises. Third, the firing platform buoy decreased the number of buoys available for water service, increasing expense and decreasing capability. Finally, the triangulation system used did not provide potential error data and was based on a relatively simplified triangulation method.

Therefore, it is desired to provide a device and method for maritime combat scoring and simulation related to maritime combat training and qualification that allows a user to capture the signature of ordnance impacting the water and analyze said signature, to improve the acoustic data logging capability, to add the capability for the RF radio repeater system to detect gun fire events and to report the gun platform's GPS location, to provide superior triangulation data for water impacts, and to remove the requirement for a separate buoy to be deployed aboard the control ship.

SUMMARY OF THE INVENTION

The present invention comprises a portable maritime scoring and simulation system that analyzes acoustic signatures to determine the location of explosive and non-explosive ordnance impacting the water. By employing this system, users may simulate live maritime combat operations and perform formal naval surface fire support team qualification exercises. Use of the present invention allows a military organization to train in any environmentally suitable location, obviating the need for training at specific test ranges in specific locations. This portability addresses significant environmental and social/political issues related to such test ranges.

Accordingly, it is an object of this invention to provide an improved maritime scoring and simulation system for maritime combat training operations and for formal naval surface fire support team qualification exercises.

It is a further object of this invention to provide an improved maritime scoring and simulation system that can provide the location of explosive and non-explosive ordnance impacting the water.

A still further object of this invention is to provide and extended acoustic data logging capability.

A still further object of this invention is to add the capability for the RF radio repeater system to detect gun fire events and to report the GPS position of the firing platform.

This invention accomplishes these objectives and other needs related to maritime combat training and formal naval surface fire support team qualification exercises by providing an improved maritime scoring and simulation system comprising three or more buoys placed in a body of water arranged in an area wherein training or qualification is planned. Attached to each of the buoys is a global positioning system receiver, an RF radio system, an acoustic analysis system, and a microprocessor. An RF radio repeater system and system controller are also employed to control and monitor the buoys. The acoustic analysis system allows each buoy to capture an acoustic signature of explosive or non-explosive ordnance impacting the water. In operation, when an explosive or non-explosive acoustic signature is captured and analyzed by the acoustic analysis system, the RF radio system transmits the time-of-arrival of the capture and GPS location of the buoy to the RF radio repeater system linked with the system controller. When three or more buoys provide such impact data, the system controller calculates the location of the impact.

The present invention also includes a method of controlling the above described system. First, the buoys are commanded to report acoustic signature -captures. In essence, the buoys are "armed". Next, a type of fire mission is selected from a predetermined list of potential missions. Fire mission data, relating to the fire mission is selected and entered into the system controller. A user then waits to receive a message from the buoys regarding acoustic signature captures, indicating ordnance impacting the water. When such a message is received from three or more of the buoys, the impact location from the acoustic signature captures is calculated. The fire mission data is then updated with the impact location. A determination is then made regarding the fire mission requirements. If further impacts are required for the specific mission, the system returns to a ready state and awaits the next impact. If further impacts are not required, the fire mission is ended. A new mission may then be programmed into the system, or the system use may be ended. When the system use is ended, the user recovers the buoy for future deployment and use of the system.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

The invention, as embodied herein, comprises a training system for maritime combat. The system uses the acoustic signature made by ordnance when it impacts the water in order to determine the impact location. The system is portable, and, therefore, allows users to deploy the system in any environmentally suitable area of water and recover the system components for transport and future use.

In general, the invention comprises an improved portable maritime scoring and simulation system that comprises three or more buoys that are deployed in an area of water selected for maritime combat training. Attached to each buoy are a global positioning system receiver, an RF radio system, an acoustic analysis system, and a microprocessor. The acoustic analysis system is designed to capture an acoustic signature of ordnance impacting the water with predetermined characteristics. The system includes an RF radio repeater system linked to a system controller to control and monitor the elements of the system. In operation, when an acoustic signature is captured by the acoustic analysis system, the RF radio system, in one embodiment, transmits the time of the capture along with the GPS location of the buoy to the RF radio repeater system linked to the system controller. When three or more buoys transmit a captured acoustic signature, the system controller computes the location of impact using a location process.

The present invention also includes a method of controlling the above described system. First, the buoys are commanded to report acoustic signature captures with predetermined characteristics. In essence, the buoys are "armed". Next, a type of fire mission is selected from a predetermined list of potential missions. Fire mission data, relating to the fire mission is selected and entered into the system controller. A user then waits to receive a message from the buoys regarding acoustic signature captures, indicating ordnance impacting the water. When such a message is received from three or more of the buoys, the impact location from the acoustic signature captures is calculated. The fire mission data is then updated with the impact location. A determination is then made regarding the fire mission requirements. If further impacts are required for the specific mission, the system returns to a ready state and awaits the next impact. If further impacts are not required, the fire mission is ended. A new mission may then be programmed into the system, or the system use may be ended. When the system use is ended, the user recovers the buoy for future deployment and use of the system.

Figure 1:
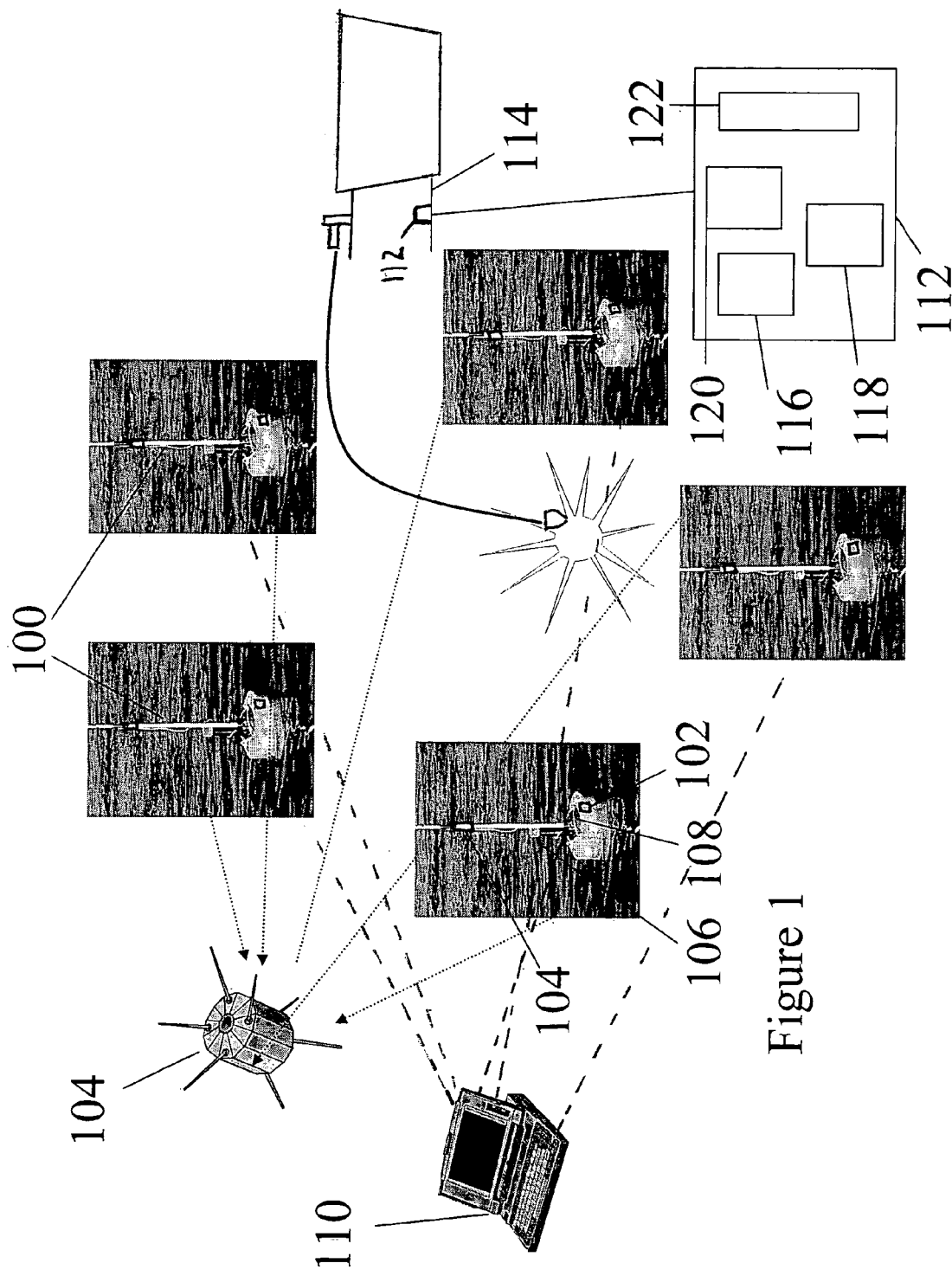
FIG. 1 shows an embodiment of the present invention system.

Referring to FIG. 1, the invention comprises three or more buoys 100. In a preferred embodiment of the invention, five buoys 100 are used. The buoys 100 are standard nautical buoys that may be selected by one skilled in the art and are sized in order to incorporate all of the other elements of the system described below without losing buoyancy. The buoys 100 are deployed in an environmentally suitable area of water that has been selected for maritime combat training and/or qualification. The buoys 100 are preferably arranged to provide an approximately equivalent distance between the buoys 100 while maximizing the area between the buoys 100. Therefore, for three buoys 100 a preferred shape of deployment would be a triangle, for four buoys 100 a preferred shape would be a square, and for five buoys, a preferred shape would be a pentagon. The distance between the buoys 100 may be selected by one skilled in the art depending upon the type of training mission to be accomplished, however, a preferred distance between the buoys 100 is about 1500 meters. The buoys 100 may normally drift freely, but may also be anchored in shallow water to reduce significant drift.

A global positioning system (GPS) receiver 102 is attached to each of the buoys 100. The attachment should ensure that the GPS receiver 102 does not fall off of the buoy 100 during training exercises and recovery and deployment and may be selected by one skilled in the art. The GPS receiver 102 is a standard unit that should allow a signal from GPS satellites 104 to locate an exact position of the GPS receiver 102, and, thereby, the buoy 100 to which it is attached.

A radio frequency (RF) radio system 104 is also attached to the buoy 100, normally using a similar attachment method as for the GPS receiver 102. The RF radio system 104, which may be selected by one skilled in the art, should transmit radio signals a distance sufficient for the system user needs.

An acoustic analysis system 106 is also attached to each buoy 100. The acoustic analysis system 106 should be able to capture the acoustic signature of explosive or non-explosive ordnance impacting the water at a distance specified by the user of the system. A preferred acoustic analysis system 106 would be a standard hydrophone, attached to the buoy 100 via a cable (preferably about 25 feet), coupled with acoustic analysis electronics that work with the hydrophone to capture the appropriate acoustic signatures required for the system. Preferred acoustic analysis electronics are based upon a TMS320C5509 digital signal processor.

A microprocessor 108 is also attached to each buoy 100. The microprocessors 108 are designed to monitor and control the GPS receiver, the RF radio system, and the acoustic analysis system and may be selected by one skilled in the art. An RF radio repeater system 112 is normally installed on the buoy deploying/recovering platform 114. The RF radio repeater system 112 links the buoy RF radio systems 104 with the system controller 110. The RF radio repeater system 112 contains a TMS320F2812 digital signal processor 116, an RF radio 118, a GPS receiver 120, and a microphone 122. The RF radio repeater 112 reports when the firing platform's gun fires using the microphone 122 and the position of the firing platform using the GPS receiver 120.

A system controller 110, which will normally be a computer terminal, preferably portable, controls and monitors all of the elements of the invention noted above via the microprocessor 108. In operation, the system controller 110 issues an arm command to the acoustic detection system 106 to listen for explosive or non-explosive ordnance impacting the water. The microprocessor, acoustic analysis system, and GPS receiver work together to compute the time-of-arrival and "x" (horizonal position within the plane tangential to the surface of the earth) and "y" (vertical position within the plane tangential to the surface of the earth.) position of the buoy. The processed data is transmitted to the system controller 110, via the RF radio system. When at least three of the acoustic detection systems 106 detect an ordnance water impact and the processed data is transmitted to the system controller 106, the system controller 106 calculates the location of the impact using a location process.

In a preferred embodiment of the invention, the system also includes an automated means for the system controller 110 to determine the location of the buoys 100 with respect to the recovering ship for buoy recovery. In the initial system concept, the buoys 100 were recovered after use of the system by manual computation of their location with regard to a nearby ship or using radar or merely visual input. The preferred automated method to locate the buoys 100 for recovery works by using the RF repeater system's GPS receiver 120 to mark the position of the recovering platform. The position of the RF repeater system's GPS receiver 120 marks the position of the ship for range and bearing calculations to the system buoys 100. First, the user requests buoy 100 recovery data via the user interface of the system controller 110. Typically, the user will request buoy 100 recovery data about once a minute. Range from the recovery ship to each buoy 100 is computed using a two-dimensional Cartesian distance formula. The bearing from the recovery ship to each buoy 100 is computed from trigonometry given the position of the RF repeater system's GPS receiver 120 and the position of each fielded buoy 100.

Figure 3A:
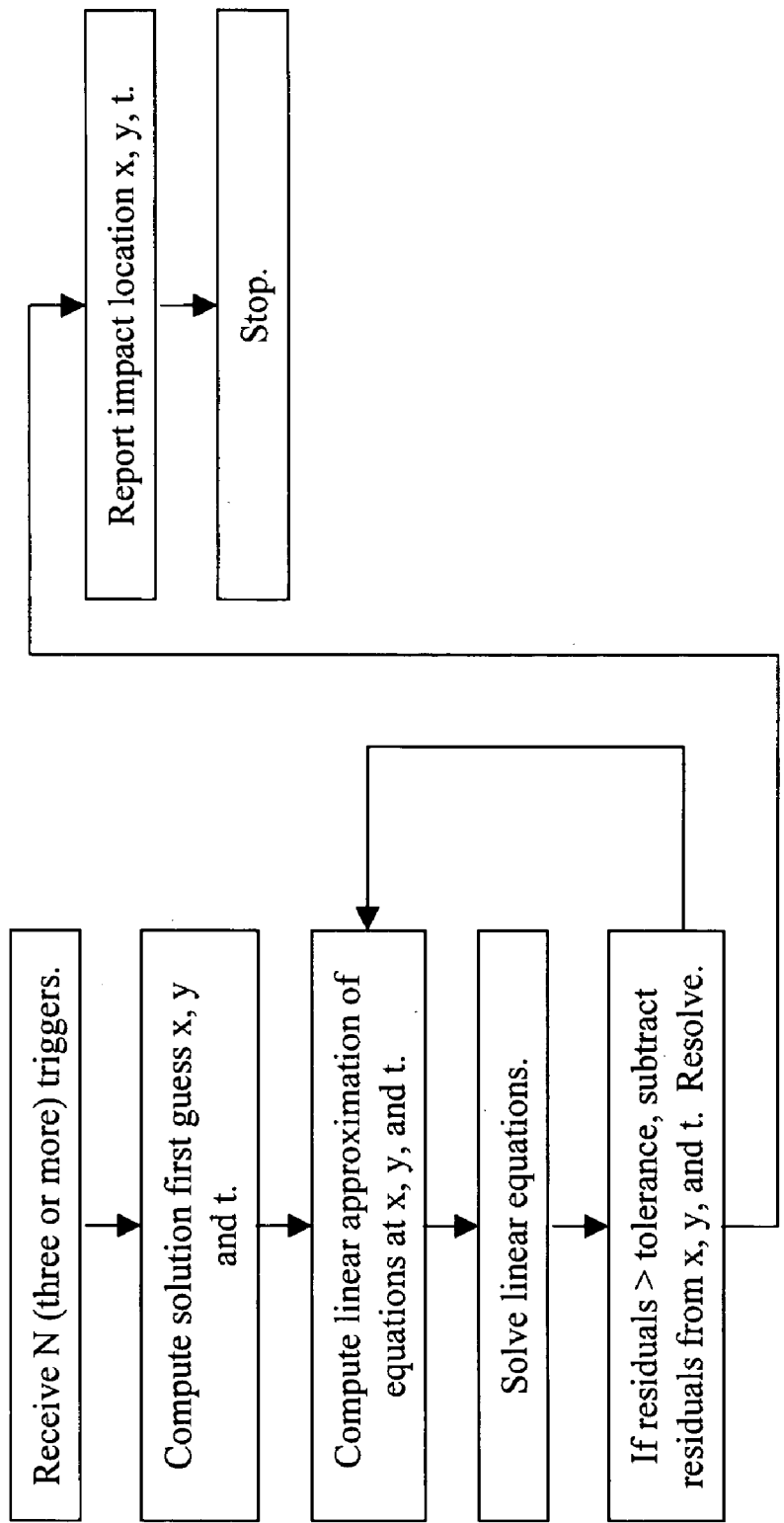
FIG. 3A shows a flow-chart for an embodiment of the impact location process for the system.
Figure 3B:
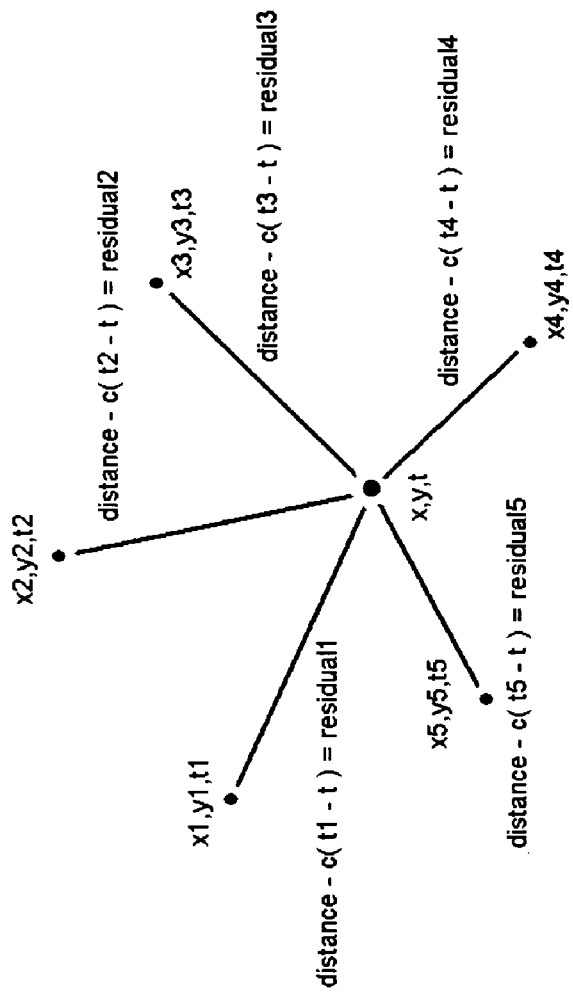
FIG. 3B shows a flow-chart to calculate the accumulated error for the impact location process of the system.
Figure 3B:
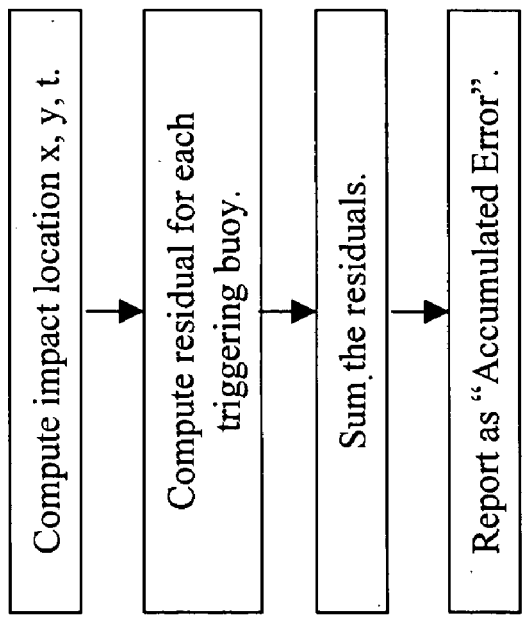

The location process is described in FIGS. 3A, 3B, and 3C. In general, the location process comprises deriving an equation with a vertical position within a two dimensional plane, a horizontal position within the two dimensional plane, and time unknowns for each buoy acoustic signature capture and solving the equations for the unknowns. A major improvement over the initial concept for the present system allows for input from more than three acoustic detection systems 106, thereby, greatly improving the location data obtained. This improved location process involves solving N simultaneous equations with the three unknowns listed above for each equation, where N is the number of acoustic detection systems that capture the acoustic signature of the ordnance water impact. Linear algebra cannot be used to solve the equations directly, because the equations are non-linear. Therefore, it is preferred that linear approximations of each equation are computed about a given point (this is done via a first guess of the unknowns being the geometric center of the the buoys 100). Preferably, a least squares method is used to solve the equations for the unknowns. When N=3, the least squares process results in a direct solution with no accumulated error. When N is greater than three, an iterative process is used on the linear approximation equations for solution. Iteration continues until the step size is less than a selected tolerance. A preferred tolerance is one micrometer for "x" and "y" and one microsecond for time.

The improved location process also includes an automatic calculation of a quality indicator defined in this application as accumulated error. This is a measure of the "goodness of data fit" of the solution for the improved location process. The accumulated error is computed by plugging the calculated impact location back into the equations described above (one for each acoustic detection system 106) and calculating a "residual" for each equation. A "perfect" solution occurs when the residuals equal zero. Normally, there are many potential contributors to residuals such as GPS position errors or irregular sound propagation paths, etc.

Figure 2:
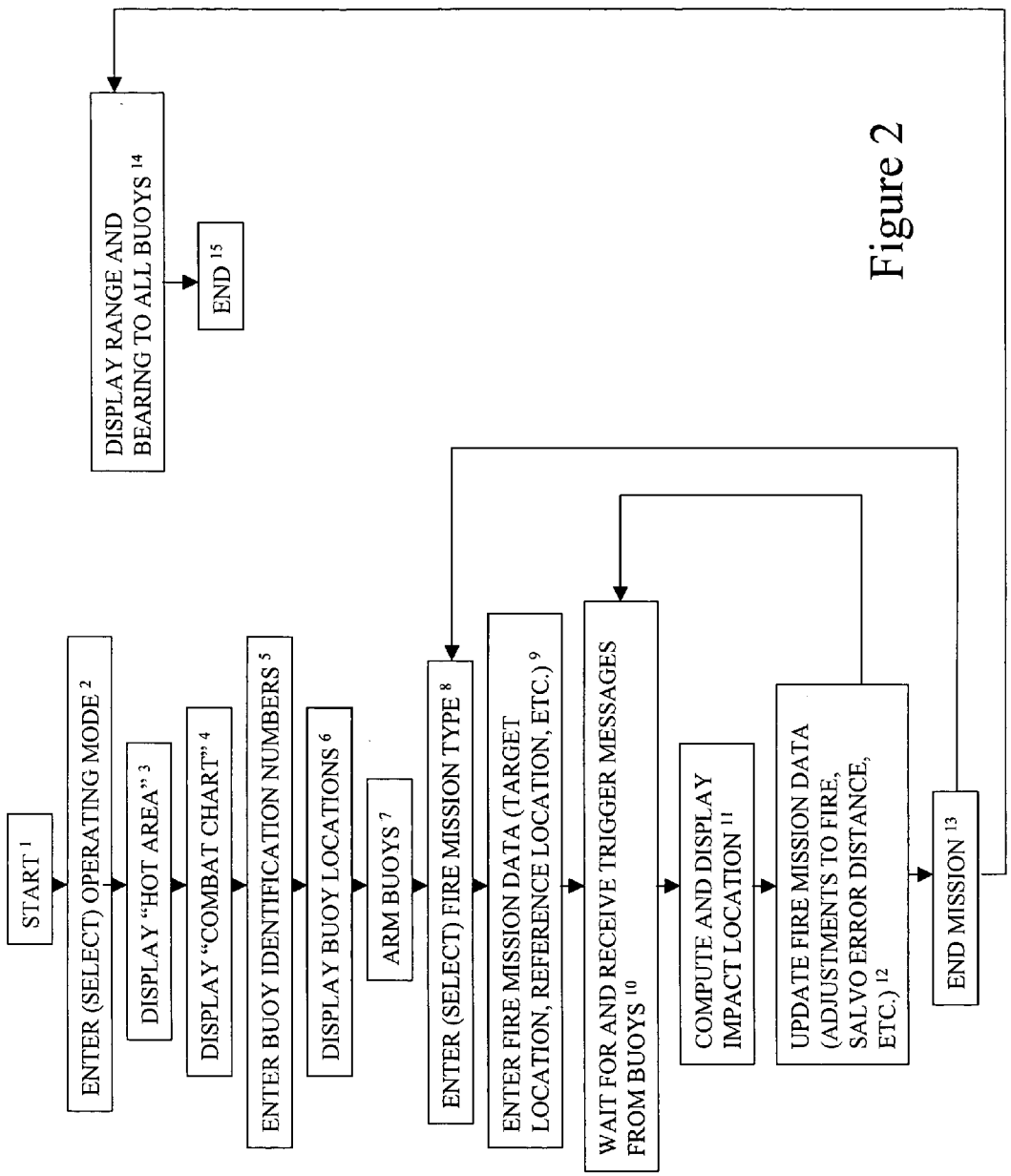
FIG. 2 shows a flow-chart depicting the general control scheme for the system.

Referring to FIG. 2, the present invention also includes a method of controlling the portable maritime scoring and simulation system described herein. In general, the process may include the following steps:

1. Commanding the buoys to report acoustic signature captures. This is normally accomplished via the system controller.

2. Selecting a fire mission type. For current U.S. naval combat, the fire missions are defined in Naval publication FXP-5B. Examples of fire missions include basic call for fire using the grid method of target location, coordinated illumination, danger close, and suppression of enemy air defense.

3. Entering fire mission data obtained from the publication noted above.

4. Waiting for messages from the buoys regarding acoustic signature captures. When at least three of the buoys provide acoustic signature captures, this triggers the system controller to go to the next step.

5. Calculating the impact location from the acoustic signature captures. This process is described in detail above.

6. Updating the fire mission data with the impact location.

7. Determining if the fire mission type requires further impacts; if further impacts are required, the system returns to a ready state; if further impacts are not required, the fire mission is ended.

8. Recovering the buoys when system use is completed.

The general method above may include the following steps:

Selecting live or simulation communication with the buoys before arming the buoys. Selecting "live" configures the system to communicate with the buoys via an RF radio system connected to a serial port and selecting "simulation" configures the system to communicate with internally simulated buoys.

Loading the last saved "hot area". A user would load the last preassigned water range area coordinates preapproved for live fire for a given time period into the system controller.

Loading and displaying a combat chart on a system controller display and entering buoy identification numbers (serial numbers) to facilitate radio communication between the buoys and the system controller.

Displaying the buoy positions on the combat chart to graphically depict buoy locations.

The method may also include steps described above such as:

Calculating the impact location by receiving messages from three or more buoys indicating an impact; and deriving linear approximation equations for two-dimensional location and time variables for each buoy sending a message, then solving the equations. The equations may be solved by a least squares method as discussed above and an accumulated error for each of the linear approximation equations may be calculated.

Finally, the recovering the buoys step may include the method and system described above. In general this step refers to the system controller calculating the distance and position of each buoy from a recovering platform.

What is described are specific examples of many possible variations on the same invention and are not intended in a limiting sense. The claimed invention can be practiced using other variations not specifically described above.

What is claimed is:

1. A portable maritime scoring and simulation system, comprising:
   at least four buoys placed in a body of water;
   a global positioning satellite (GPS) receiver attached to each buoy to provide a GPS location of the buoys;
   an radio frequency (RF) radio system attached to said each buoy;
   an acoustic analysis system attached to said each buoy to capture an acoustic signature of ordnance impacting the water;
   a microprocessor attached to said each buoy, wherein the microprocessor monitors and controls the GPS receiver, the RF radio system, and the acoustic analysis system;
   a system controller to control and monitor the microprocessor; and,
   an RF radio repeater system linking the RF radio system with the system controller,
      wherein when the acoustic signature is captured by the acoustic analysis system, the RF radio system transmits a time of capture and the GPS location of said each buoy to the system controller through the RF radio repeater system,
      wherein when said at least four buoys transmit the acoustic signature, which is captured, the system controller computes a location of impact using a location process, and
      wherein the location process comprises a calculated accumulated error computed by summing residuals, each of said residuals is an output generated from a calculated impact location and said GPS location of said each buoy.

2. The system of claim 1, further comprising five buoys.

3. The system of claim 2, wherein the five buoys comprise locations in a substantially pentagonal shape.

4. The system of claim 1, wherein the location process comprises a derived non-linear equation for an unknown vertical position within a two dimensional plane, an unknown horizontal position within the two dimensional plane, and an unknown time of the impact N-simultaneous equations solved for the unknowns.

5. The system of claim 1, wherein the location process employs a least squares method.

6. The system of claim 1, further comprising an automated capability for the system controller to determine the GPS location of the buoys with respect to a ship for buoy recovery,
   wherein the RF repeater system marks the position of the ship for range and bearing calculations to the buoys.

7. The system of claim 1, wherein the calculated accumulated error comprises a calculation of accumulated error in determining an ordnance impact location in relation to each said acoustic signature, which is captured.

8. The system of claim 1, wherein the RF radio repeater system comprises a digital signal processor, an RF radio, a GPS receiver, and a microphone.

9. A method of controlling a portable maritime scoring and simulation system, comprising:
   commanding buoys to report acoustic signature captures;
   selecting a fire mission type;
   entering fire mission data;
   waiting for messages from the buoys regarding the acoustic signature captures;
   calculating through a system controller and an acoustic analysis system an impact location from the acoustic signature captures using a location process;
   updating the fire mission data with the impact location;
   determining a requirement of the fire mission type for further impacts and returning the portable maritime scoring and simulation system to a ready state, otherwise ending a fire mission; and,
   recovering the buoys when the portable maritime scoring and simulation system use is completed,
      wherein when an acoustic signature is captured by said acoustic analysis system, an RF radio system transmits a time of capture and a GPS location of each of said buoys to the system controller through an RF radio repeater system, and
      wherein the location process comprises a calculated accumulated error computed by summing residuals, each of said residuals is an output generated from a calculated impact location and said GPS location of each of said buoys.

10. The method of claim 9, further comprising selecting live or simulation communication with the buoys before arming the buoys.

11. The method of claim 9, further comprising loading and displaying a combat chart on a system controller display; and,
   entering buoy identification numbers for each of the buoys to facilitate radio communication between the buoys and the system controller.

12. The method of claim 9, further comprising displaying buoy positions on a combat chart to graphically depict buoy locations.

13. The method of claim 9, wherein calculating the calculated impact location includes messages received from at least four buoys indicating an impact; linear approximation equations are derived for two-dimensional location and time variables for each of the buoys, which sends a message; and, the linear approximation equations are solved.

14. The method of claim 9, wherein said messages are received from more than three buoys.

15. The method of claim 13, wherein the linear approximation equations are solved by a least squares method.

16. The method of claim 13, wherein said accumulated error is calculated using each of the linear approximation equations.

17. The method of claim 9, wherein said recovering the buoys includes the system controller calculates a distance and position of each of the buoys from a vessel.

* * * * *